(12) United States Patent
Amemiya (10) Patent No.: US 8,869,067 B2
(45) Date of Patent: Oct. 21, 2014

(54) OPERATING DEVICE, CONTROL PANEL, AND IMAGE FORMING APPARATUS INCLUDING SAME

(75) Inventor: Kanae Amemiya, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 788 days.

(21) Appl. No.: 12/686,002

(22) Filed: Jan. 12, 2010

(65) Prior Publication Data

US 2010/0177361 A1 Jul. 15, 2010

(30) Foreign Application Priority Data

Jan. 13, 2009 (JP) ................................. 2009-004192

(51) Int. Cl.
*H04N 1/32* (2006.01)
*H04N 1/00* (2006.01)

(52) U.S. Cl.
CPC ....... *H04N 1/00384* (2013.01); *H04N 1/00493* (2013.01)
USPC ............ 715/834; 358/468; 200/341; 200/345

(58) Field of Classification Search
None
See application file for complete search history.

(56) References Cited

U.S. PATENT DOCUMENTS

| | | | | |
|---|---|---|---|---|
| 5,494,363 A * | 2/1996 | Hochgesang | ................ | 400/495 |
| 5,706,488 A * | 1/1998 | Gallup et al. | ................ | 712/223 |
| 6,091,675 A * | 7/2000 | Lee | ............... | 369/30.36 |
| 6,259,866 B1 * | 7/2001 | Kabumoto et al. | ............... | 399/1 |
| 6,304,739 B1 | 10/2001 | Katsuyama et al. | | |
| 6,452,786 B1 * | 9/2002 | Ogata et al. | ................ | 361/625 |
| 6,507,720 B2 | 1/2003 | Kabumoto et al. | | |
| 6,831,629 B2 * | 12/2004 | Nishino et al. | ............... | 345/157 |
| 7,196,691 B1 * | 3/2007 | Zweig | ............... | 345/168 |
| 7,275,808 B2 | 10/2007 | Katsuyama et al. | | |
| 7,469,981 B2 | 12/2008 | Katsuyama et al. | | |
| 7,595,712 B2 * | 9/2009 | Nishino et al. | ............... | 335/207 |
| 7,616,448 B2 * | 11/2009 | Degenkolb et al. | ............ | 361/752 |
| 7,916,460 B2 * | 3/2011 | Henty | ............ | 361/679.15 |
| 7,992,102 B1 * | 8/2011 | De Angelo | ............... | 715/834 |
| 8,001,488 B1 * | 8/2011 | Lam | ............... | 715/834 |
| 2002/0084920 A1 * | 7/2002 | Olodort et al. | ................ | 341/22 |

(Continued)

FOREIGN PATENT DOCUMENTS

| | | |
|---|---|---|
| JP | 2001-331253 A | 11/2001 |
| JP | 2002-543712 A | 12/2002 |

(Continued)

OTHER PUBLICATIONS

User's Guide, Brother Industries, Ltd, (copyrigth 1996-2003), Version C, cover page, copyright pp. 1-3 through 1-10, and 3-1 through 3-3, http://download.brother.com/welcome/doc000065/ZL2FB UG US C.P DF.*

(Continued)

*Primary Examiner* — Matt Kim
*Assistant Examiner* — Mahelet Shiberou
(74) *Attorney, Agent, or Firm* — Oblon, Spivak, McClelland, Maier & Neustadt, L.L.P.

(57) ABSTRACT

An operating device included in an control panel for an image forming apparatus, the operating device that includes multiple input keys to operate independently from each other, disposed on the control panel, surrounding a center portion; and at least one indicator comprising at least one of letters and marks representing a function of one at least of the multiple input keys, located in the center portion adjacent to the one of the multiple input keys.

20 Claims, 8 Drawing Sheets

(56) References Cited

U.S. PATENT DOCUMENTS

| | | | |
|---|---|---|---|
| 2002/0122031 A1* | 9/2002 | Maglio et al. | 345/184 |
| 2002/0141803 A1* | 10/2002 | Arnold et al. | 400/103 |
| 2005/0017832 A1* | 1/2005 | Gutierrez et al. | 335/78 |
| 2005/0066370 A1* | 3/2005 | Alvarado et al. | 725/80 |
| 2006/0196759 A1* | 9/2006 | Soumi | 200/341 |
| 2008/0239168 A1* | 10/2008 | Henty | 348/734 |
| 2009/0006998 A1* | 1/2009 | Neeleman et al. | 715/771 |
| 2009/0074494 A1 | 3/2009 | Katsuyama et al. | |
| 2010/0193341 A1* | 8/2010 | Uotani | 200/5 A |

FOREIGN PATENT DOCUMENTS

| | | |
|---|---|---|
| JP | 2003-107963 A | 4/2003 |
| JP | 2005-63227 A | 3/2005 |
| JP | 3656586 | 3/2005 |
| WO | WO 00/65806 | 11/2000 |

OTHER PUBLICATIONS

Office Action issued Dec. 7, 2012 in Japanese Patent Application No. 2009-004192.

* cited by examiner

OPERATING DEVICE, CONTROL PANEL, AND IMAGE FORMING APPARATUS INCLUDING SAME

CROSS-REFERENCE TO RELATED APPLICATIONS

This patent specification claims priority from Japanese Patent Application No. 2009-004192, filed on Jan. 13, 2009 in the Japan Patent Office, the entire contents of which are hereby incorporated by reference herein.

BACKGROUND OF THE INVENTION

1. Field of the Invention

The present invention relates to an operating device, a control panel including the operating device, and an image forming apparatus including the control panel.

2. Discussion of the Background

In general, multi-function machines combining two or more of copying, printing, and facsimile functions are used as image forming apparatuses.

Typically, operation devices (e.g., control panels) for the image forming apparatuses include multiple keys and at least one liquid crystal display (LCD), and are used to input and display information, execute instructions, carry out various settings, and so forth.

Certain known operating devices include a so-called D-pad key, in which keys are disposed in four directions, right, left, up, and down.

Examples of keys used in certain known operating devices (input devices) are shown in FIGS. 8A, 8B, 8C, 8D, 8E, 9A, 9B, 9C, and 9D.

Figure 8A:
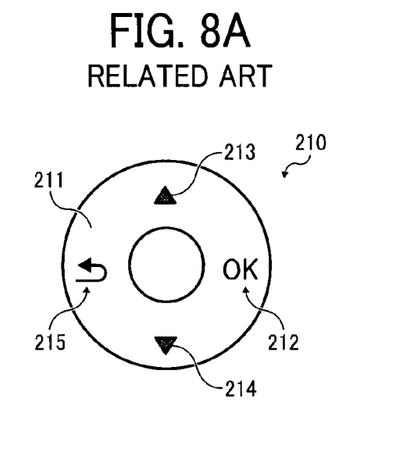

In the example shown in FIG. 8A, a disciform input key 211 is disposed, and by pressing the disciform input key 211 in four directions, various functions are executed. In this example, letters "OK" 212, representing the function to execute the selected menu item displayed on a LCD, are located on a right side of the disciform input key 211; a mark "▲" 213 representing the function to move up a list of menu items displayed on LCD is located on lower side of the disciform input key 211; a mark "▼" 214 representing the function to move down the list of menu items displayed on LCD is located on lower side of the disciform input key 211; and a return mark "←" 215 representing the function to move back the list of menu items displayed on the LCD 24 is located on a left side of the disciform input key 211.

However, in this example, because the input key 211 is integrated as a single continuous annular unit, users cannot press the disciform input key 211 in two or more directions at once.

Certain known image forming apparatuses include the above-described direction keys in their operating devices. More specifically, a pair of vertical direction keys facing each other and a pair of lateral direction keys are integrated as a single key unit. The vertical direction keys are used to select operating mode, and the lateral direction keys are used to change setting amount of operating mode.

However, in the above-described configurations in which the multiple keys are formed in a single integrated button, although the relation between keys is clearer there is the problem that, because multiple keys are operated by the identical button, users frequently press the wrong key. Further, users cannot press at least two of those keys at once, and therefore operations requiring simultaneous operation of more than one button cannot be executed.

Figure 8B:
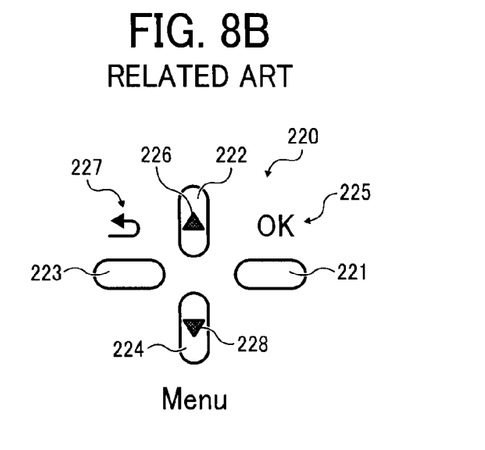
Figure 8C:
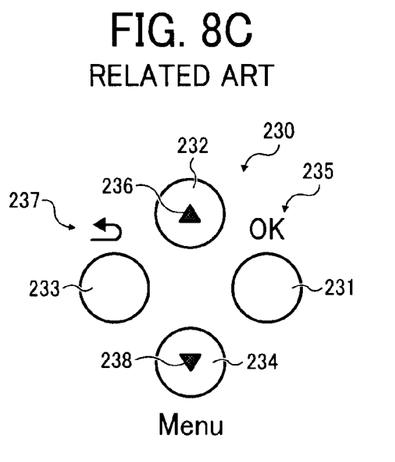
Figure 8D:
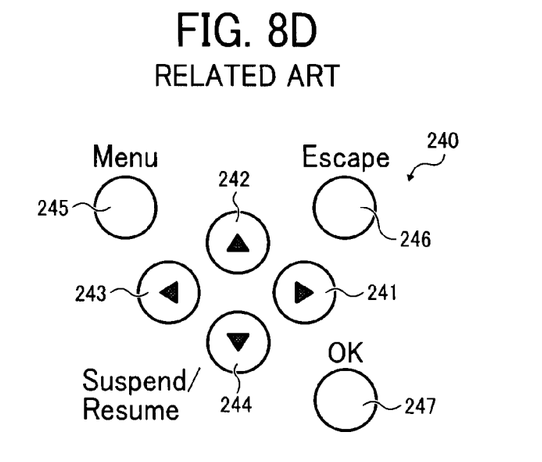

A different problem arises when the keys are not continuous but separated, as shown in FIGS. 8B-8D. An operating device 220 shown in FIG. 8B includes four independent ellipsoidal input keys 221, 222, 223, and 224. On the operating device 220, letters "OK" are displayed beneath the right input key 221, mark "▲" 226 is displayed on the upper input key 222, the mark "▼" 228 is displayed on the lower input key 224, and the return mark "←" is displayed above the left input key 223.

An operating device 230 shown in FIG. 8C includes four independent round input keys 231, 232, 233, and 234. On the operating device 230, letters "OK" 235, marks "▲" 236 and "▼" 237, and a return mark "←" 238 are displayed similarly to the operating device 220.

An operating device 240 shown in FIG. 8D further includes a menu button 245, an escape button 246, and an OK button 247, in addition to four independent round input keys 241, 242, 243, and 244 on which the respective four directions are displayed.

In the above-described examples, because the operation keys are completely independent from each other, it is difficult for the users to grasp the relations among the respective input keys.

Figure 8E:
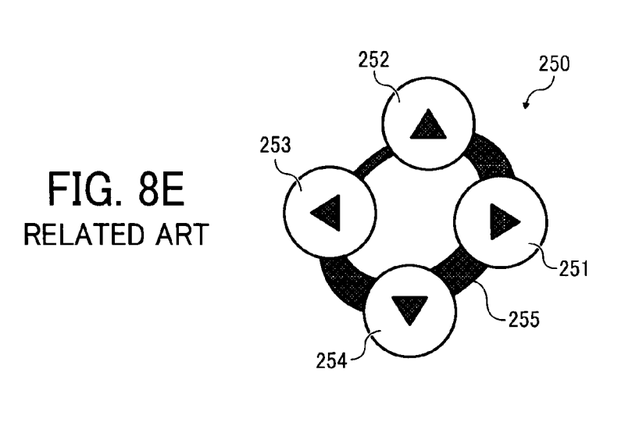

An operating device 250 shown in FIG. 8E includes four independent round input keys 251, 252, 253, and 254 on which the respective four directions are displayed. A pattern 255 that shows relationship among the direction input keys 251, 252, 253, and 254 is printed on a surface of the operating device 250.

However, in the above-described example, because there are no indicators for operation, the user cannot correctly press the input keys without looking up a LCD.

Figure 9A:
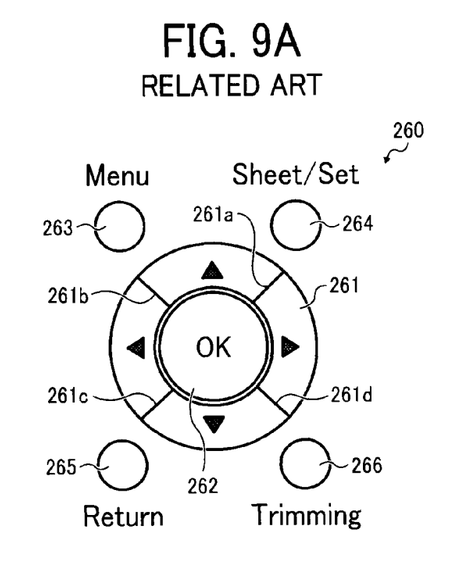

An operating device 260 shown in FIG. 9A includes a continuous annular key 261 that is integrated as a single continuous annular unit having four parts divided by four grooves 261a, 261b, 261c, and 261d. A user selects four (right, left, up, and down) directions by pressing the divided four parts. An "OK" button 262 is provided in a center portion of the continuous annular key 261, and a "Menu" button 263, "Sheet/Set" button 264, a "Return" button 265, and a "Trimming" button 266 are provided to surround the continuous annular key 261.

Figure 9B:
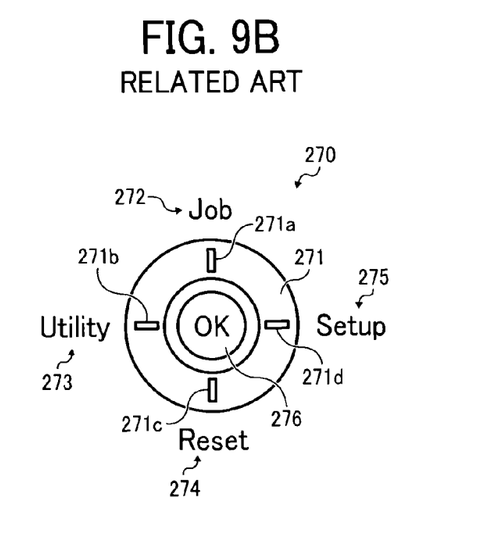

An operating device 270 shown in FIG. 9B includes a continuous annular key 261 that is integrated as a single unit and on which four projection portion 271a, 271b, 271c, and 271d are formed. Additionally, the upper projection 271a is for jobs selection as indicated by letters "Job" 272; the left projection 271b is for utility setting as indicated by letters "Utility" 273; the lower projection 271c functions is for reset as indicated by letters "Reset" 274; and the right projection 271 is for set up as indicated by letters "Set up" 275. An "OK" button 276 is provided in a center portion surrounded by the continuous annular key 271.

Figure 9C:
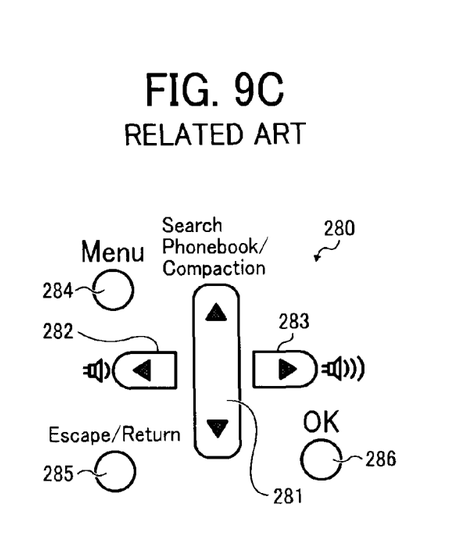

An operating device 280 shown in FIG. 9C includes a rounded-rectangular key 281 used to select up and down as well as to search phonebook and call up abbreviated addresses; and two input keys 282 and 283 used to select left and right as well as to increase and decrease volume. Additionally, "Menu" button 284, "Escape/Back" button 285, and "OK" button 286 are provided on the operating device 280.

Figure 9D:
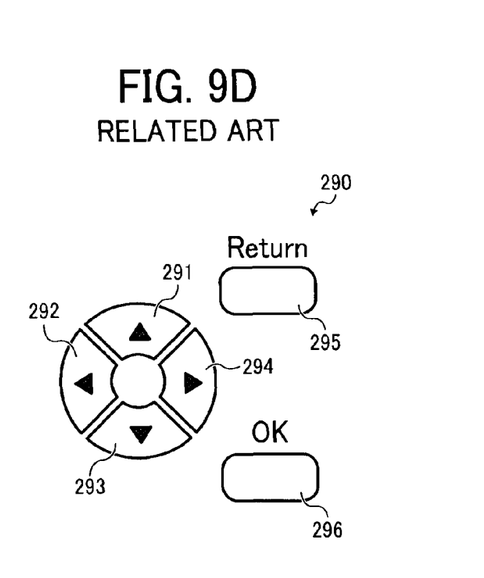

An operating device 290 shown in FIG. 9D includes four quarter sector-shaped direction keys 291, 292, 293, and 294 that are arranged in a discontinuous annular shape and used to select right, left, up, and down. Additionally, a "Return" button 295 and an "OK" button 296 are provided on the operating device 290.

However, in this example, the user must look up an LCD whenever the operation keys are used because the indicator indicating the name of the function is not provided adjacent to the direction keys 291, 292, 293 and 294. Moreover, in the above-descried examples shown in FIG. 9A through 9D, because the indicators or the buttons are provided outside the direction keys, a large space is required, and thus, flexibility on design is limited, which is not desirable.

SUMMARY OF THE INVENTION

In view of the foregoing, one illustrative embodiment of the present invention provides an operating device included in a control panel for an image forming apparatus. The operating device includes a center portion disposed on the control panel; multiple input keys that operate independently from each other, disposed on the control panel, surrounding the center portion; and at least one indicator including at least one of letters and marks representing a function of one of the multiple input keys, located in the center portion adjacent to the one of the multiple input keys.

Another illustrative embodiment of the present invention provides a control panel for an image forming apparatus that includes a liquid crystal display (LCD) to display a list of menu items; the operating device to be used to select one of the menu items displayed on the liquid crystal display; and the operating device described above.

Yet another illustrative embodiment of the present invention provides an image forming apparatus that includes an image forming unit to form an image; an automatic document feeder to feed a document to the image forming unit; and the control panel described above.

BRIEF DESCRIPTION OF THE DRAWINGS

A more complete appreciation of the disclosure and many of the attendant advantage thereof will be readily obtained as the same becomes better understood by reference to the following detailed description when considered in connection with the accompanying drawings, wherein:

FIGS. 8A through 9D are expanded plan views illustrating operating devices according to the related art.

DETAILED DESCRIPTION OF PREFERRED EMBODIMENTS

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image forming apparatus that is a multicolor printer (hereinafter referred to as a printer) according to an illustrative embodiment of the present invention is described.

The image forming apparatus according to the present embodiment is a multifunction machine that functions as a printer that prints images on sheets of recording media in accordance with instruction from host devices such as computers, a scanner that scans original documents, a facsimile, and a copy device.

Figure 1:
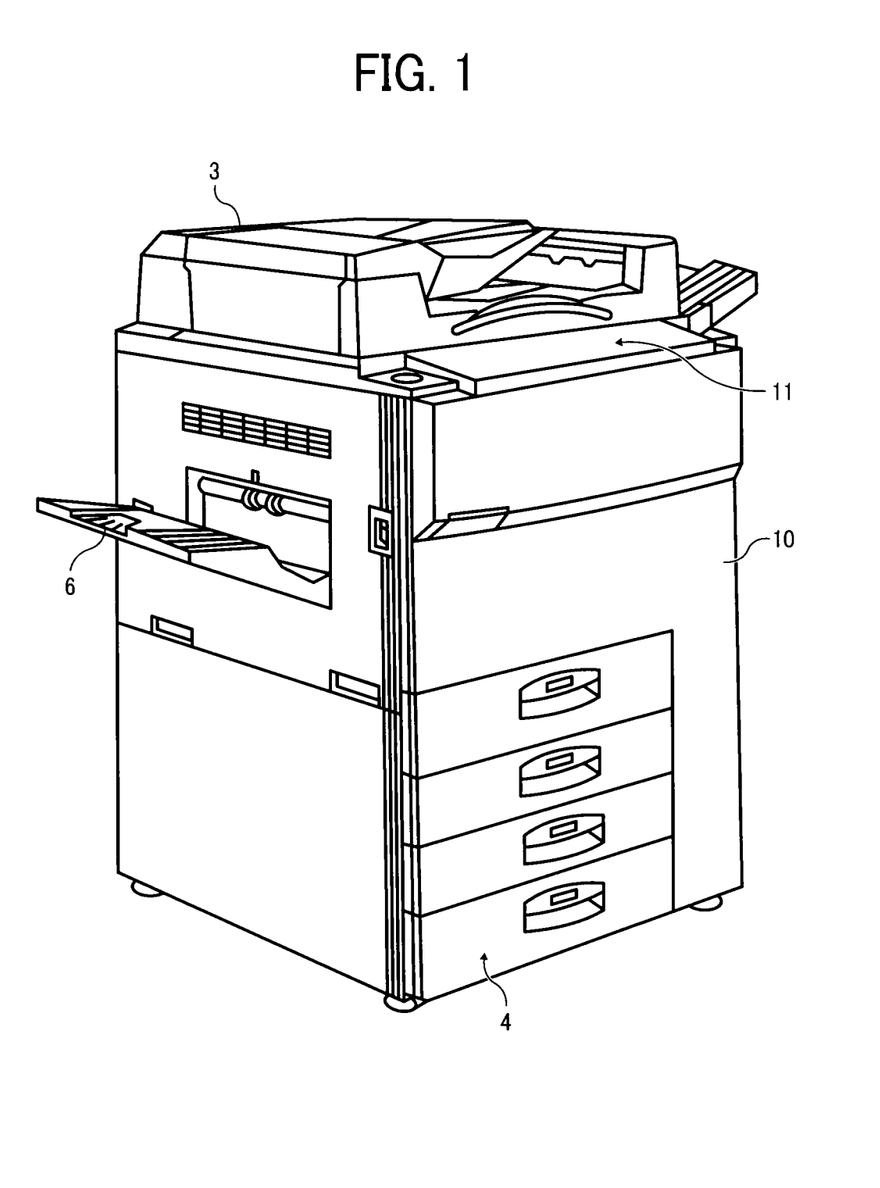
FIG. 1 is a schematic perspective diagram illustrating an image forming apparatus according to one illustrative embodiment of the present invention.
Figure 2:
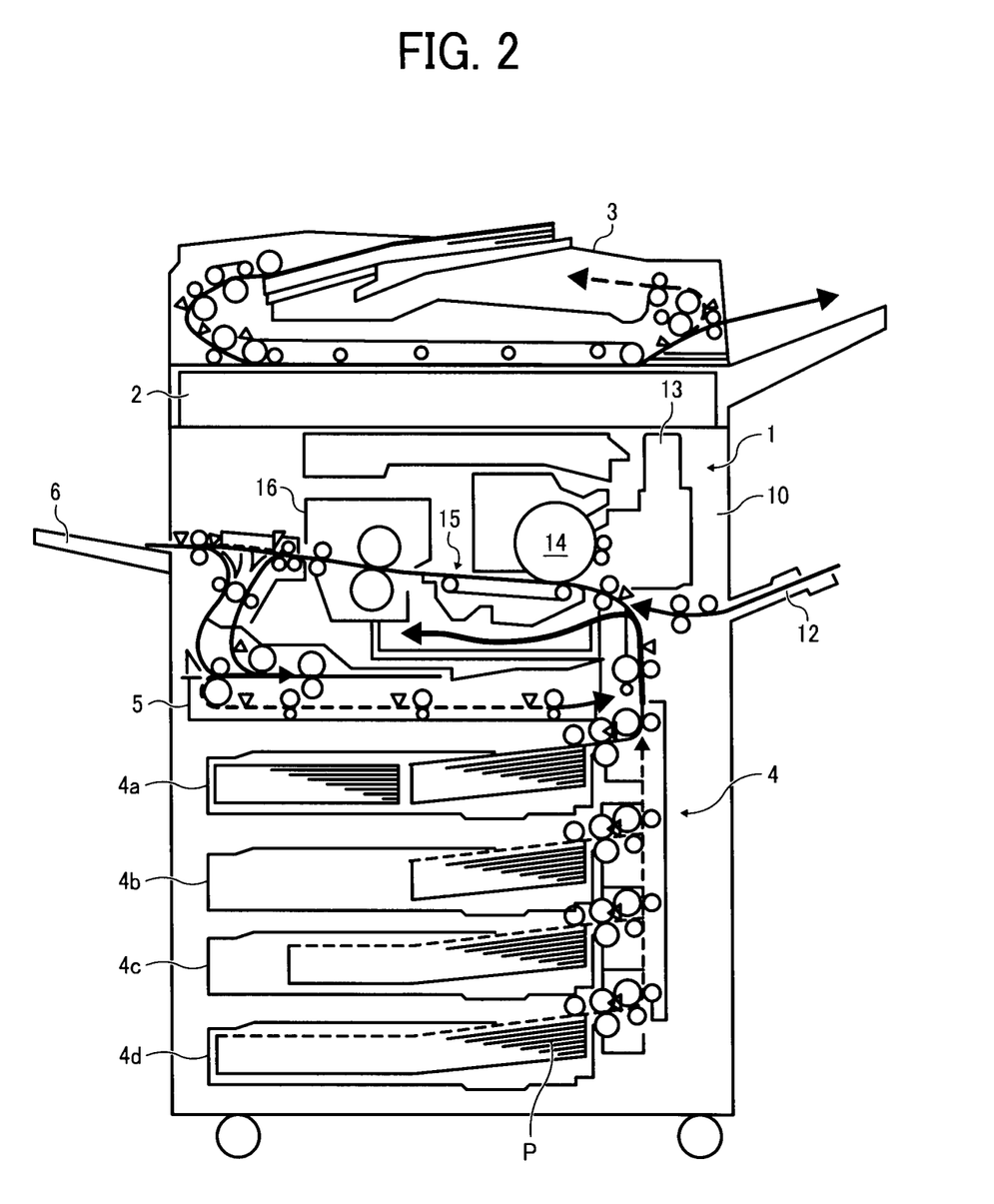
FIG. 2 is a cross-sectional diagram illustrating a configuration of the image forming apparatus shown in FIG. 1.

FIG. 1 is a schematic perspective diagram illustrating the image forming apparatus, and FIG. 2 is a cross section diagram illustrating a configuration of the image forming apparatus shown in FIG. 1.

With reference to FIGS. 1 and 2, the image forming apparatus includes an image forming apparatus body 10 and an automatic document feeder (ADF) 3. The image forming apparatus body 10 includes an image formation unit 1, a scanner 2, a transfer-sheet feed device 4, a double-sided print tray 5, a discharge tray 6, a control panel 11, and a manual sheet tray 12. The image formation unit 1 forms an image in an electrophotographic method, the scanner 2 scans the image data on a document, and the ADF 3 automatically feeds the document to a position where a document is scanned. The transfer-sheet feed device 4 includes feed trays 4a, 4b, 4c, and 4d and feeds the various sizes of sheets to the image forming unit 1. The transfer-sheet P also can be set on the manual sheet tray 12.

When images are formed on both sides of the transfer-sheet P in a duplex printing operation, after the image is formed on one side of the transfer-sheet P, the transfer-sheet P is temporarily contained in the double-sided print tray 5 and then fed to the image forming unit 1 by the double-sided print tray 5. The discharge tray 7 receives the transfer-sheet P on which the image is printed.

The control panel 11 is disposed on an upper side of the image forming apparatus body 10. The image forming apparatus unit 1 includes a development device 13, a photoreceptor drum 14, a transfer-transport mechanism 15, and a fixing device 16. Conveyance paths (indicated by arrows shown in FIG. 2) that convey the transfer-sheet P fed from the transfer-sheet feed device 4 or the manual sheet tray 12 are formed in the image forming apparatus body 10.

Next, a configuration around the operating device 100 of the image forming apparatus according to the present embodiment is described below.

Figure 3:
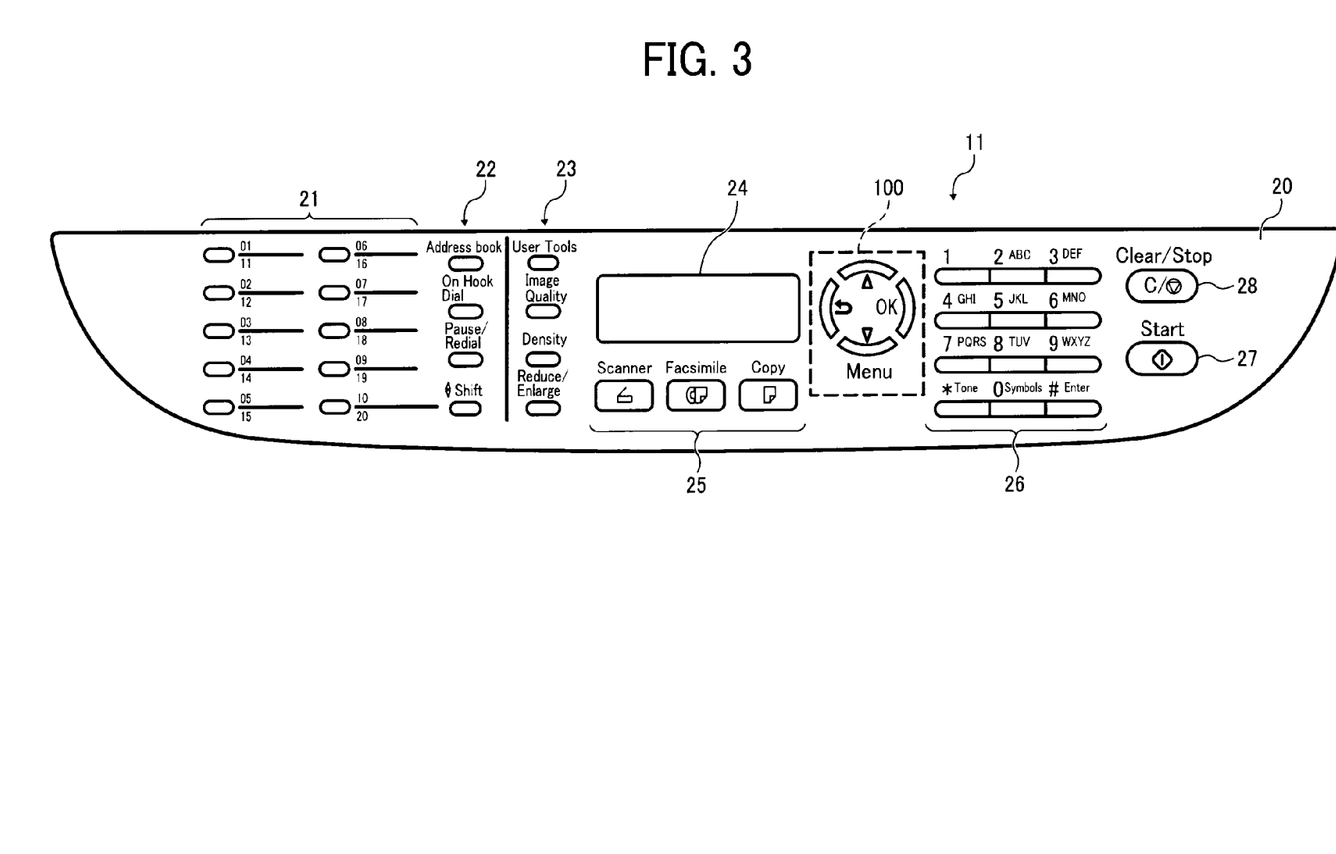
FIG. 3 is a plan view illustrating a control panel of the image forming apparatus.
Figure 4A:
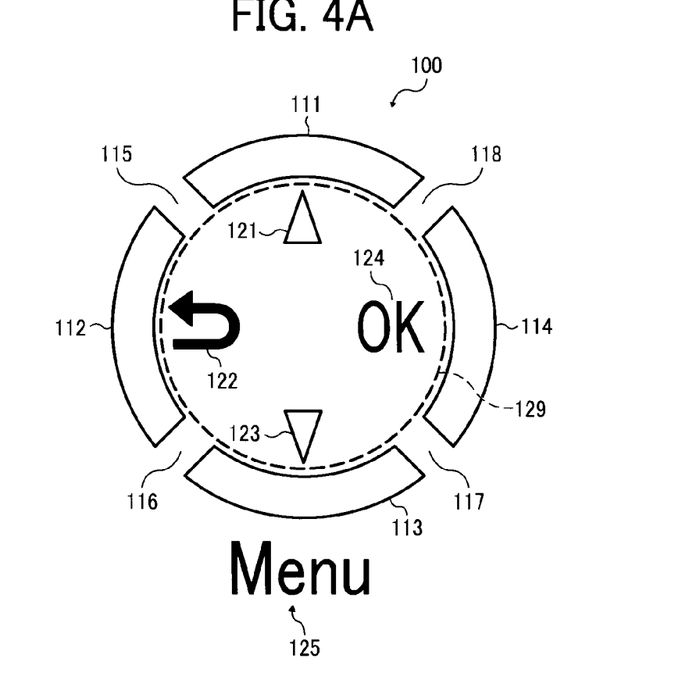
FIG. 4A is an expanded plan view illustrating an operating device included in the control panel shown in FIG. 3.

FIG. 3 is a plan view illustrating the control panel 11 of the image forming apparatus, and FIG. 4A is an expanded plan view illustrating the operating device 100 shown in FIG. 3.

With reference to FIG. 3, address input keys 21, facsimile set keys 22, scanning set keys 23, a liquid crystal display (LCD) panel 24, function select keys 25, a alphanumeric keypad 26, a start key 27, a clear/stop key 28, and the operating device 100 (to be described in detail below) are disposed on a surface 20 of the control panel 11. The users can select a registered facsimile address by pressing one of the address input keys 21. The LCD panel 24 displays operation menus and operation states. The function select key 25 is used to select the function of the image forming apparatus among scanning, facsimile transmission, and copying. The alphanumeric keypad 26 is used for inputting letters and numbers.

It is to be noted that the shape of the control panel 11 is not to be limited to that in the present embodiment, and any shape is applicable as long as the surface panel fits the operation portion to which the control panel 11 is attached.

The operating device 100 is used to select one of the menu items displayed on the LCD panel 24. As shown in FIG. 4A, in the operating device 100, four arcuate shaped input keys, namely, an upper input key 111, a left input key 112, a lower input key 113, and a right input key 114 are provided annularly, in four directions to right and left or up and down in FIG. 4A. Four gaps 115, 116, 117, and 118 are formed between the respective input keys 111, 112, 113, and 114. That is, the multiple input keys 111, 112, 113, and 114 are arranged so as to surround a center portion 129 and are disposed in discontinuous annular arrangement.

A known switch element (not shown) is provided on the back side of each of the respective input keys 111, 112, 113, and 114, and the switch element is activated by pressing each of the input keys 111, 112, 113, and 114, and the image forming apparatus 100 performs an operation specified by the input keys 111, 112, 113, or 114 that is pressed.

The respective input keys 111, 112, 113, and 114 can be operated independently from each other, and additionally, a predetermined operation can be executed by pressing at least two of those keys at once.

Letters and marks that represent functions of the image forming apparatus to be executed by pressing the respective input keys 111, 112, 113, and 114 are represented in the center portion 129 surrounded by the respective input keys 111, 112, 113, and 114. Additionally, each of the letters and marks is located adjacent to the corresponding input key 111, 112, 113, or 114.

In this configuration, the mark "Δ" 121 representing the function to move up a list of menu items displayed on the LCD panel 24 is located beneath the upper input key 111; the mark "←" 122 representing the function to move back the list of menu items displayed on the LCD panel 24 is located right side of the left input key 112; the mark "▼" 123 representing the function to move down the list of menu items displayed on the LCD panel 24 is located above the lower input key 113; and the letters "OK" representing the function to execute the selected menu item displayed on the LCD panel 24 is located left side of the right input key 114. The letters "MENU" 125 represents that the operating device 100 executes menu selection.

Figure 4B:
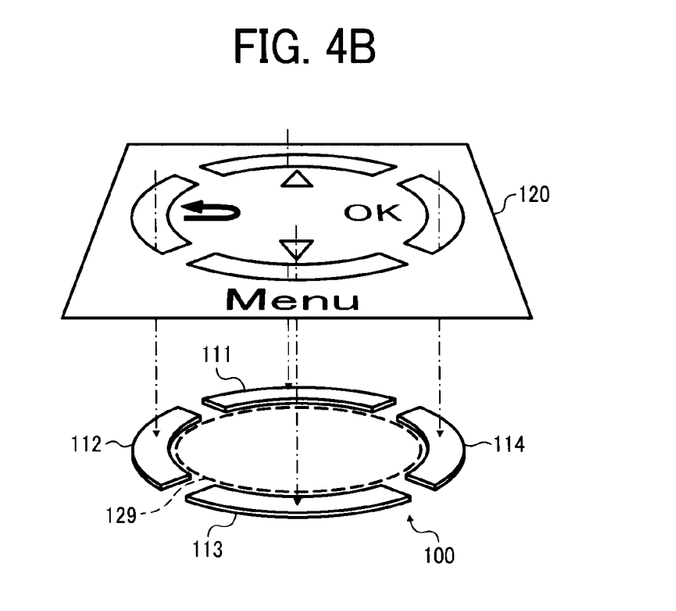
FIG. 4B is a perspective view illustrating the operating device shown in FIG. 4A when a sheet member is attached to the operating device.

As shown in FIG. 4B, these letters and marks are displayed on a sheet member 120 covering the surface 20 of the control panel 11. More specifically, at least one indicator (the letters and marks) is displayed on the sheet member 120, and the sheet member 120 is attached on the control panel 20 so as to cover an area including at least the center portion 129.

Therefore, when the language of the displayed letters and marks is changed according to the nation or area to which the image forming apparatus is shipped, the control panel can be used conveniently in the respective nations and areas.

In this present configuration, a pressure is exerted in a direction in which the respective input keys 111, 112, 113 and 114 are pressed.

Figure 5:
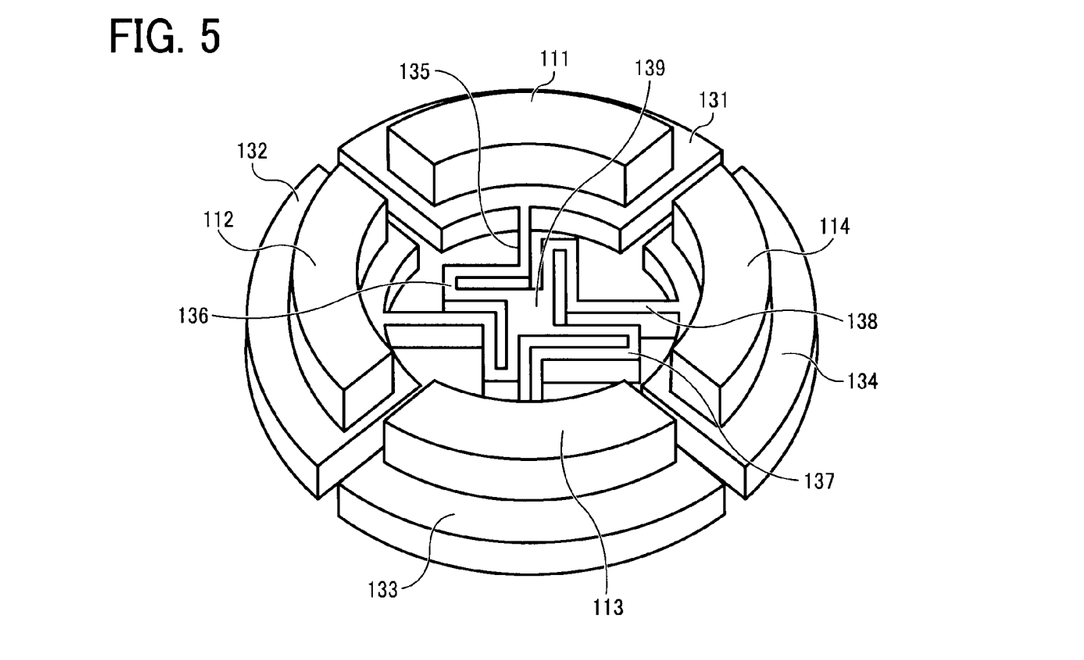
FIG. 5 is a perspective view illustrating a configuration of the input keys of the operating device shown in FIG. 4A.

FIG. 5 is a perspective view illustrating a configuration of the input keys of the operating device 100. The respective input keys 111, 112, 113, and 114 are integrally formed with and on bases 131, 132, 133, and 134 that are larger than the respective input keys 111, 112, 113, and 114. The respective bases 131, 132, 133, and 134 are connected to a center portion 139 that is fixed on a base (not shown) of the control panel 11 by runners (branch portion) 135, 136, 137, and 138.

In this configuration, the input keys 111, 112, 113, and 114; the bases 131, 132, 133, and 134; the runners 135, 136, 137, and 138; and the central portion 139 are integrated as a single unit formed of elastic plastic. The runners 135, 136, 137, and 138 function as passages for the plastic when the operating device is formed as an integrated single unit.

Therefore, when the input keys 111, 112, 113, and 114 are pressed, the bases 131, 132, 133, 134 move together with the keys, but the runners 135, 136, 137, and 138 bias the base and the input keys to return their original positions by elastic force once the pressure is removed. The runners 135, 136, 137, and 138 serve as biasing members.

Figure 6:
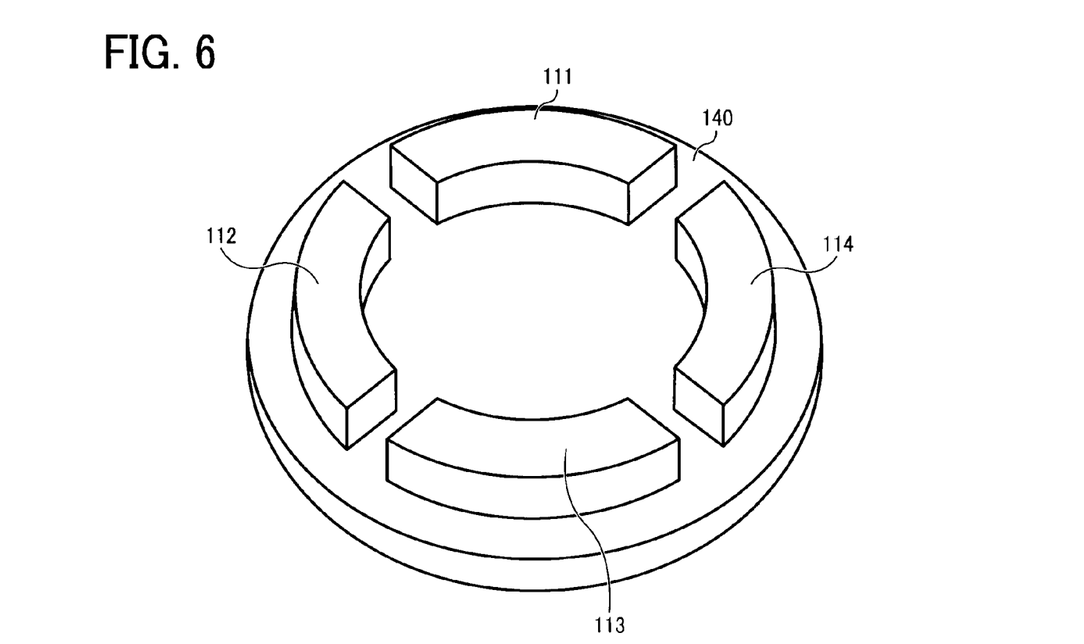
FIG. 6 is a perspective view illustrating a configuration of input keys according to another embodiment.

FIG. 6 is a perspective view illustrating a configuration of input keys according to another embodiment. In this configuration, the input keys 111, 112, 113, and 114 are provided to contact an elastic disciform member 140 formed of an elastic element such as synthetic rubber.

Similarly to the above-described configuration, the input keys 111, 112, 113, and 114 are pressed, and the elastic disciform member 140 biases the input keys 111, 112, 113 and 114 to return their original positions by elastic force once the pressure is removed. In this embodiment, the elastic disciform member 140 serves as a biasing member.

Figure 7:
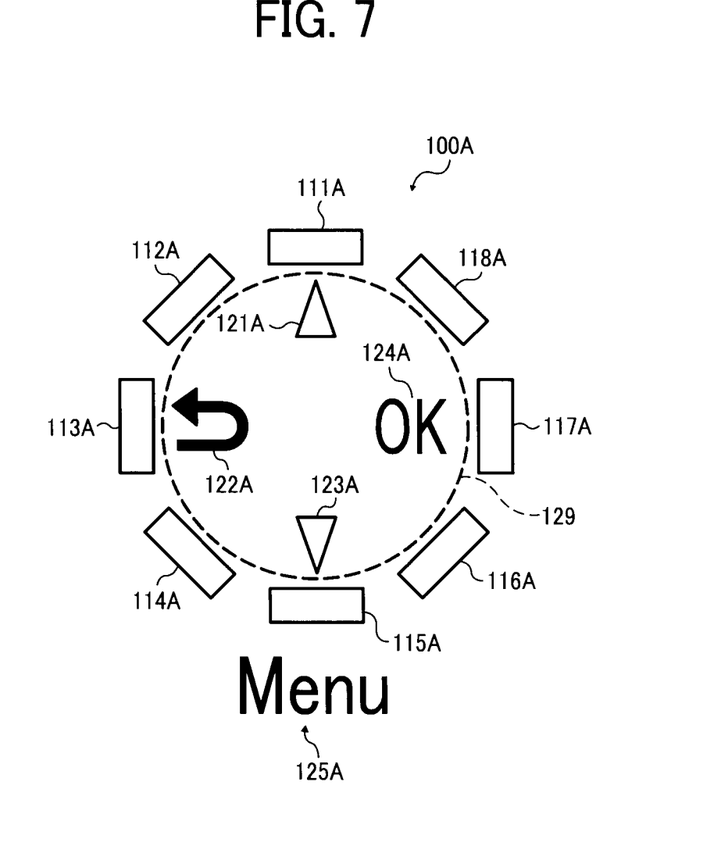
FIG. 7 is an expanded plan view illustrating an operating device according to another embodiment.

In the above-described embodiments, four input keys are provided and the input keys are arranged annularly. However, in the present invention, the number of the input keys is not limited to four. Additionally, as shown in FIG. 7, the input keys may be arranged around the center portion in non-circular fashion, that is, as a polygon. In this case, the multiple input keys are arranged so as to surround the center portion and are disposed in multi-angled arrangement.

As described above, in the operating device of the image forming apparatus according to the above-described embodiments, the respective input keys are arranged so as to surround a center portion of the input keys, and therefore, the users can grasp the relations among the respective input keys relatively easily, and additionally, pressing a wrong key can be prevented because the respective keys are arranged independently from each other. Moreover, in these configurations, at least one indicator (letters and marks for user to grasp the function) is displayed on the operating keys via the sheet member 120, the user can press the input keys without looking up the LCD. Additionally, because the indicators (the letters and the marks) are located on the center portion (inside the input keys), the surrounding space of the input keys is not required; and therefore, the vicinity of the operating device can be more compact.

Furthermore, because the descriptions of the respective keys are provided in the center portion surrounded by the multiple input keys, the operating device can be used for various nations and areas by changing the language of these descriptions.

Numerous additional modifications and variations are possible in light of the above teachings. It is therefore to be understood that, within the scope of the appended claims, the disclosure of this patent specification may be practiced otherwise than as specifically described herein.

What is claimed is:

1. A control panel for an image forming apparatus, comprising:
   a display to display multiple menu items; and
   an operating device to select one of the menu items displayed on the display, the operating device including:
   multiple input keys that operate independently from each other and that are disposed on the control panel, the multiple input keys being arranged to form, in a plan view of the operating device, a discontinuous annular shape that divides the operating device into arc segments, each arc segment corresponding to a respective one of the multiple input keys disposed in the discontinuous annular arrangement, a sheet member attached to an externally exposed surface of the control panel so as to cover at least an area of the externally exposed surface of the control panel surrounded by the multiple input keys disposed in the discontinuous annular arrangement, the sheet member having portions thereof directly on and over respective upper faces the multiple input keys, the upper faces being opposite respective mounting sides of the multiple input keys, wherein the sheet member includes as a labeling at least one indicator including at least one of letters and marks representing a function of at least one of the multiple input keys, the at least one indicator being located adjacent to a respective one of the multiple input keys, over a portion of said area of the externally exposed surface of the control panel, and being surrounded by the multiple input keys disposed in the discontinuous annular arrangement, multiple key bases on which the multiple input keys are respectively formed, multiple runners, each of which is connected to a respective one of the multiple key bases, and a center portion surrounded by the multiple key bases, wherein each of the multiple runners extends in a direction toward the center portion, and wherein the multiple runners are connected to each other at the center portion.

2. The control panel according to claim 1, wherein the display is a liquid crystal display (LCD), and the operating device is disposed adjacent to the LCD.

3. The control panel according to claim 1, wherein a top surface of the sheet member is exposed.

4. The control panel according to claim 1, wherein the multiple runners form a portion of a biasing member to exert pressure in a direction opposite to a direction in which one of the multiple input keys is pressed.

5. The control panel according to claim 4, wherein the biasing member is an elastic member disposed adjacent to the multiple input keys.

6. The control panel according to claim 1, wherein two or more input keys of the multiple input keys are simultaneously press-able to execute a given operation.

7. The control panel according to claim 1, wherein the multiple input keys are disposed in a multi-angled arrangement.

8. An image forming apparatus comprising:
an image forming unit to form an image;
an automatic document feeder to feed a document to the image forming unit; and
a control panel including:
a display to display multiple menu items; and
an operating device configured to select one of the menu items displayed on the display, the operating device having:
multiple input keys that operate independently from each other and that are disposed on the control panel, the multiple input keys being arranged to form, in a plan view of the operating device, a discontinuous annular shape that divides the operating device into arc segments, each arc segment corresponding to a respective one of the multiple input keys disposed in the discontinuous annular arrangement,
a sheet member attached to an externally exposed surface of the control panel so as to cover at least an area of the externally exposed surface of the control panel surrounded by the multiple input keys disposed in the discontinuous annular arrangement, the sheet member having portions thereof directly on and over respective upper faces the multiple input keys, the upper faces being opposite respective mounting sides of the multiple input keys, wherein the sheet member includes as a labeling at least one indicator including at least one of letters and marks representing a function of at least one of the multiple input keys, the at least one indicator being located adjacent to a respective one of the multiple input keys, over a portion of said area of the externally exposed surface of the control panel, and being surrounded by the multiple input keys disposed in the discontinuous annular arrangement, multiple key bases on which the multiple input keys are respectively formed, multiple runners, each of which is connected to a respective one of the multiple key bases, and a center portion surrounded by the multiple key bases, wherein each of the multiple runners extends in a direction toward the center portion, and wherein the multiple runners are connected to each other at the center portion.

9. The control panel according to claim 1, wherein the center portion is fixed on a panel base of the control panel.

10. The control panel according to claim 9, wherein the multiple input keys, the multiple key bases, the multiple runners, and the center portion are a single unit formed of elastic plastic.

11. The image forming apparatus according to claim 8,
wherein each of the multiple input keys is formed in one piece with respective ones of the key bases, each said key base being wider than the respective input key in the plan view of the operating device and being connected to a corresponding one of the runners so as to act as a biasing member to return the multiple input keys to a neutral position,
wherein the multiple input keys disposed in the discontinuous annular arrangement are disposed in a multi-angled arrangement, and
wherein two or more of the multiple input keys are simultaneously press-able to execute a given operation.

12. The image forming apparatus according to claim 8,
wherein the multiple input keys are formed in one piece with an elastic biasing member configured to return the multiple input keys to a neutral position, and
wherein the multiple input keys disposed in the discontinuous annular arrangement are disposed in a polygonal arrangement so as to surround an area.

13. The control panel according to claim 1, further comprising an alphanumeric keypad to input letters and numbers,
wherein the display is disposed closer to the operating device than to the alphanumeric keypad.

14. The control panel according to claim 1, further comprising a function select key portion to select a function of the image forming apparatus, selectable functions including scanning, facsimile transmission, and copying.

15. The control panel according to claim 14, wherein the operating device is disposed adjacent to a side face of the display, and the function select key portion is disposed adjacent to a lower face of the display.

16. The image forming apparatus according to claim 8, wherein the sheet member is uncovered.

17. The control panel according to claim 1, wherein each of the multiple runners has a first portion which extends in the direction toward the center portion and a second portion which extends in a direction different from the direction toward the center portion.

18. The control panel according to claim 1, wherein the multiple key bases are arranged to form, in the plan view of the operating device, a discontinuous annular shape.

19. The image forming apparatus according to claim 8,
wherein the multiple input keys, the multiple key bases, the multiple runners, and the center portion are a single unit formed of elastic plastic, and
wherein the multiple key bases are arranged to form, in the plan view of the operating device, a discontinuous annular shape.

20. The image forming apparatus according to claim 8, wherein each of the multiple runners has a first portion which extends in the direction toward the center portion and a second portion which extends in a direction different from the direction toward the center portion.

\* \* \* \* \*